(12) United States Patent
Conradt et al.

(10) Patent No.: US 8,467,299 B2
(45) Date of Patent: Jun. 18, 2013

(54) METHOD FOR CLASSIFYING NETWORK COMPONENTS OF A PACKET-ORIENTED NETWORK

(75) Inventors: Michael Conradt, Brunnthal (DE); Jürgen Totzke, Poing (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 2852 days.

(21) Appl. No.: 10/759,073

(22) Filed: Jan. 20, 2004

(65) Prior Publication Data

US 2004/0146008 A1  Jul. 29, 2004

(30) Foreign Application Priority Data

Jan. 20, 2003  (DE) .................................. 103 01 963

(51) Int. Cl.
*H04J 3/14* (2006.01)

(52) U.S. Cl.
USPC ............ 370/241; 370/254; 709/223; 709/224

(58) Field of Classification Search
USPC ......................................................... 370/254
See application file for complete search history.

(56) References Cited

U.S. PATENT DOCUMENTS

| | | | | |
|---|---|---|---|---|
| 5,651,006 A * | 7/1997 | Fujino et al. | ................... | 370/408 |
| 5,796,736 A | 8/1998 | Suzuki | | |
| 6,249,814 B1 | 6/2001 | Shaffer et al. | | |
| 6,377,987 B1 * | 4/2002 | Kracht | ........................... | 370/254 |
| 6,516,345 B1 * | 2/2003 | Kracht | ........................... | 370/254 |
| 6,804,712 B1 * | 10/2004 | Kracht | ........................... | 709/223 |
| 2002/0032761 A1 * | 3/2002 | Aoyagi et al. | ................ | 709/223 |

FOREIGN PATENT DOCUMENTS

DE  19526001  2/1996

OTHER PUBLICATIONS

Case et al., Management Information Base for Version 2 of the Simple Network Management Protocol (SNMPv2), RFC 1907, p. 5.*
McCloghrie et al., Management Information Base for Network Management of TCP/IP-based internets: MIB-II, RFC 1213, pp. 16, 18 and 27.*
Lin, Hwa-Chun, et al., "An Algorithm for Automatic Topology Discovery of IP Networks", Department of Computer Science, National Tsing Hua University, 1998.
Gavalas, Damianos, et al., "A Hybrid-Centralised—Distributed Network Management Architecture", Electronic Systems Engineering Department, University of Essex, 1999.
Lipinski, Klaus, "Encyclopedia of Data Communication", International Thompson Publishing, 4th Edition, 1996 (ISBN 3-8266-4003-9).

* cited by examiner

*Primary Examiner* — Jeffrey M Rutkowski
(74) *Attorney, Agent, or Firm* — Staas & Halsey LLP

(57) ABSTRACT

In the method, starting from a central management component as the basis it is determined in a first step whether a network component is a management-capable network component. If this is the case, the management-capable network component is classified on the basis of services provided in the past by the management-capable network component. A classification is made here into the classes host, router and switch.

11 Claims, 2 Drawing Sheets

METHOD FOR CLASSIFYING NETWORK COMPONENTS OF A PACKET-ORIENTED NETWORK

CROSS REFERENCE TO RELATED APPLICATIONS

This application is based on and hereby claims priority to German Application No. 10301963.4 filed on Jan. 20, 2003, the contents of which are hereby incorporated by reference.

BACKGROUND OF THE INVENTION

The present invention relates to a method for classifying network components based on a central management component—often referred to in the literature as a manager.

In the last several years it has become apparent that communication is acquiring ever-increasing importance. This communication is handled to a large extent over "classical" telephone networks—also referred to in the literature as "public switched telephone networks". In parallel with the telephone networks there also exist data networks, with their most well-known representative, the Internet. Currently it is mainly text and image messages that are exchanged over IP-oriented networks of this kind (IP: Internet Protocol). Planning, installation, maintenance and operation of the networks are necessary in both environments, which in some cases causes high costs. These costs are incurred both for the IP-oriented network and for the telephone network. It would therefore be desirable to combine the two previously separate networks so that the costs incurred only arise once.

A problem with this scenario is that the two networks have different characteristics. The telephone networks provide connection-oriented, real-time-capable services. In the Internet architecture, which is the most widespread architectural form among the data networks, a connectionless, packet-oriented service is defined. In this system the packets are forwarded "hop-by-hop" in accordance with the so-called "best effort" principle. This means that the packets are routed by the intermediate stations in the network autonomously in each case as far as the next station (hop-by-hop) and are handled "in the best possible way". As a result, in overload situations or if a station is not properly configured, packets can be delayed or even lost. This behavior is, however, undesirable for real-time connections such as telephone calls or videoconferences, since audible or visible disruptions can occur if packets are lost or delayed.

In order to achieve a convergence of the networks so that all the services are provided in a shared data network it is necessary to take measures by which real-time-capable services can be established in spite of the poorly suited architecture of the data network. A prerequisite for this is to be able to assure a certain quality of service in the data network. "Quality of Service" (QoS for short)—as it is referred to in the literature—is used to describe certain characteristics such as a maximum bandwidth, a maximum packet delay time or a loss rate.

Existing approaches to the management of QoS features in IP-oriented networks proceed according to the principle that the route taken by the packets between the two communication end points is determined at the time of the connection setup. A corresponding reservation is made on every individual connection facility that the packets pass en route. The Resource Reservation Protocol (RSVP for short) may be cited here as an example. One of the disadvantages with this type of reservation is the requirement that each intermediate system has to be prepared for the RSVP protocol in order to be able to perform local reservations at all. With older networks this entails the problem that all the components have to be expanded or upgraded or even replaced by new ones. A further problem is that architectures of this kind are poorly scalable with the size of the IP-oriented network since delays are caused at each intermediate system as a result of the reservation to be made. A more critical issue, however, is the check performed on the data streams in the intermediate systems, which leads to serious delays even with an already existing connection.

A different approach is that of the so-called external QoS management. In this case the reservations do not take place within the IP-oriented network, but are made outside in a supervising entity—often referred to in the literature as a "manager". This manager decides whether additional real-time traffic volumes with a given quality of service can still be allowed or not. In order to be able to make this decision, two preconditions must be met. The manager must know the traffic volumes already transported in the network and their features, and it must have accurate information about the status and structure of the IP-oriented network. The first precondition is already fulfilled by the adopted procedure. The external manager already knows all the traffic volumes in the IP-oriented network since they have been registered with it and permitted accordingly or rejected.

The second precondition in order to be able to establish an external QoS management in IP-oriented networks is a precise knowledge of their topology and hence the route over which the individual packets are transported in the network. The network architecture is, however, designed such that all decisions are made locally and preferably autonomously in the individual network components. For this reason in IP-oriented networks there is no entity to be found which knows the topology of the whole network. However, in order to be able to make local decisions it is necessary for the components in the IP-oriented network to possess information as a basis for making the decision. This information includes of local (i.e. limited to the immediate environment) views on the overall topology. An example of this is the so-called "forwarding database" of a communication system operating on layer 2 of the OSI reference model—the system often being referred to in the literature as a "switch"—which database represents a part of the local view of the switch on the overall network. A global view of the topology can be generated with the aid of these local topology views. The widespread "Simple Network Management Protocol"—SNMP for short—is often used for interrogating the local views of the network components. With the aid of this standard it is possible to poll the status and therefore also the local view of the network component in a non-proprietary (vendor-independent) manner.

The basic structure of a data network management architecture is illustrated with the aid of FIG. 1. This architecture has four main components:

Taking a central management component M as the basis, the management-capable network components G-A, G-B, G-C of the IP-oriented network DN are accessed. For this purpose there are provided in the management-capable network components G-A, G-B, G-C so-called management agent units A, each of which provides a management interface for the management-capable network components G-A, G-B, G-C. The data exchange between the central management component M and the management agent units A takes place by the SNMP management protocol already referred to. The exchange can be initiated either by the central management component M or by the management agent units A.

The management agent units A are also used for administration of a management information base MIB stored in each of the management-capable network components G-A, G-B, G-C. The management information base MIB comprises a plurality of so-called "managed objects" MO. A managed object MO is a variable which describes or specifies the status or the history of a management-capable network component G-A, G-B, G-C. The information that is stored in a managed object MO is specified inter alia in the RFC 1213 standard; McCloghrie, M. Rose: "Management Information Base for Network Management of TCP/IP-based Internets: MIB-II", March 1991.

The totality of all managed objects MO present in a network component G-A, G-B, G-C forms the management information base MIB. Thus, the management information base MIB describes the history of a management-capable network component G-A, G-B, G-C, its status and therefore also its local view on the IP-oriented network DN.

At the beginning of a topology discovery it is necessary to identify which network components are present in an IP-oriented network. In an IP-oriented network there is no central entity which knows all the subscribers, so an inquiry known as a "ping" is transmitted to every possible address in the local subnetwork. A network component which receives such a "ping" with its address returns (providing it is not configured very unusually) a response packet to the entity transmitting the "ping"—in the present case the central management component M. In this way it is possible to discover all the network components in the IP-oriented network which respond to ping inquiries. The addresses of the identified network components are then stored.

The next step in the discovery of the topology is to classify the identified network components; in other words, to subdivide them into different categories such as, for example, host, router or switch.

In this context a host is taken to mean a network component assigned to a user, such as, for example, a desktop computer or a so-called "IP phone".

The term "router" is generally used to refer to network components with switching capacity in packet-switching networks in which the packets are switched on the basis of layer 3 of the OSI reference model.

The term "switch", on the other hand, is used to refer to network components with switching capacity in packet-switching networks in which the packets are switched on the basis of layer 2 of the OSI reference model.

A subdivision is necessary because different information can be polled from the network components in the individual categories. Thus, for example, a router possesses information about further subnetworks which a switch or host does not possess.

In the related art a network component is classified by a query addressed to the corresponding managed object MO provided for the classification in the management information base MIB. In many of the products available in the marketplace, however, unsuitable or even incorrect values are entered in the management information base MIB. Furthermore the managed objects MO are used inconsistently by different vendors as a result of an unclear definition of the standard. For these reasons it is not possible to correctly classify different network components with the aid of the contents provided for this purpose in the management information base MIB.

SUMMARY OF THE INVENTION

One possible object of the present invention is therefore to specify a method by which a correct classification of network components is made possible.

Here, network components of a packet-oriented network are classified taking a central management component as the basis. In a first step it is determined whether or not a network component is a management-capable network component. If the result is affirmative, the management-capable network component is classified with the aid of services provided in the past by the management-capable network component. In this process the network components are differentiated into host, switch or router for the purpose of the classification.

A significant advantage is that the method can be implemented with only a small amount of overhead in already existing systems.

An advantage is, among other things, that a vendor-independent classification of the network component is made easily possible through reference to information available as standard and a combination of characteristics and of the history of a network component.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
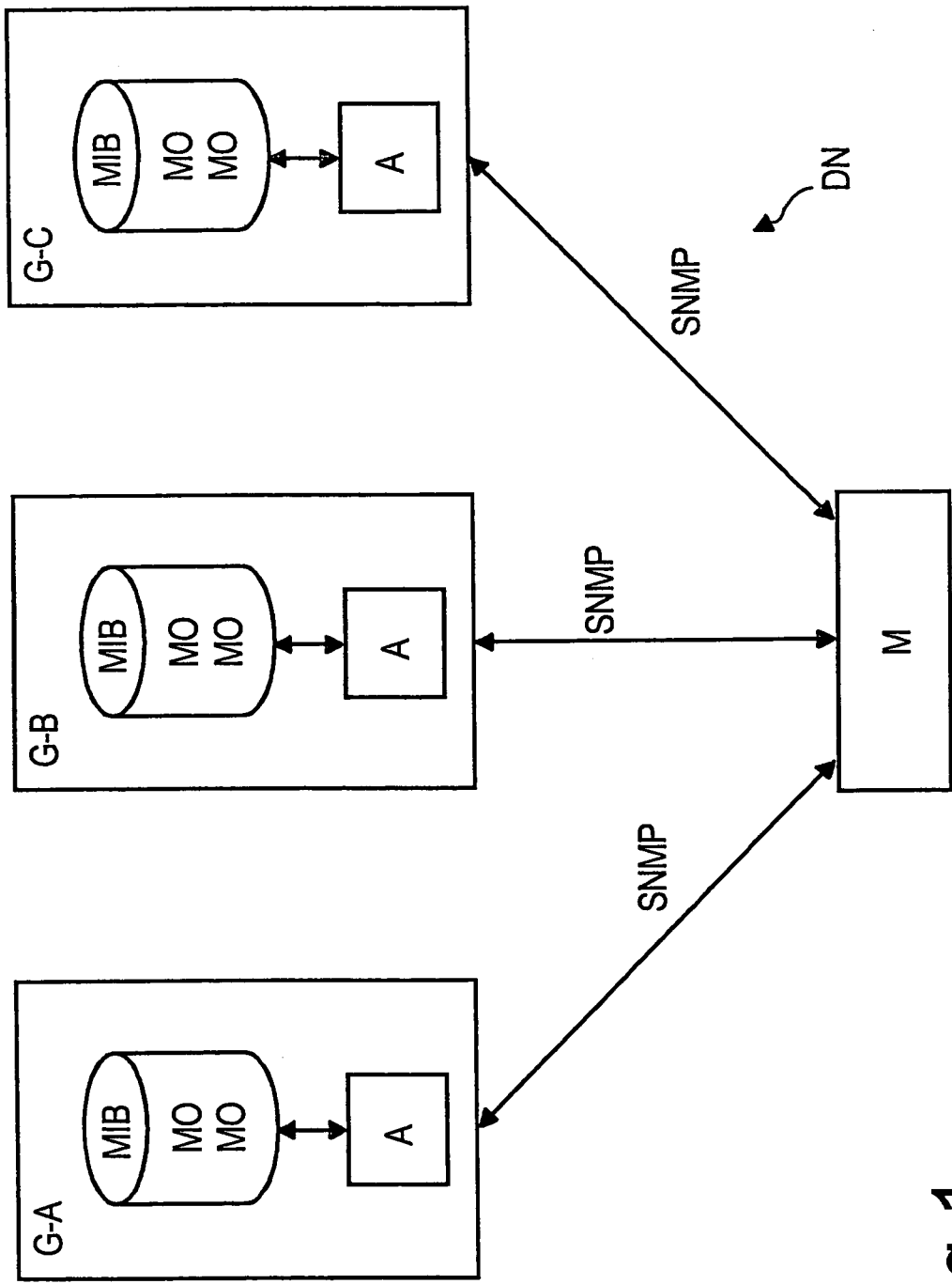
FIG. 1 shows a structogram containing the main functional units of a management architecture in a packet-oriented network.

Reference will now be made in detail to the preferred embodiments of the present invention, examples of which are illustrated in the accompanying drawings, wherein like reference numerals refer to like elements throughout.

Figure 2:
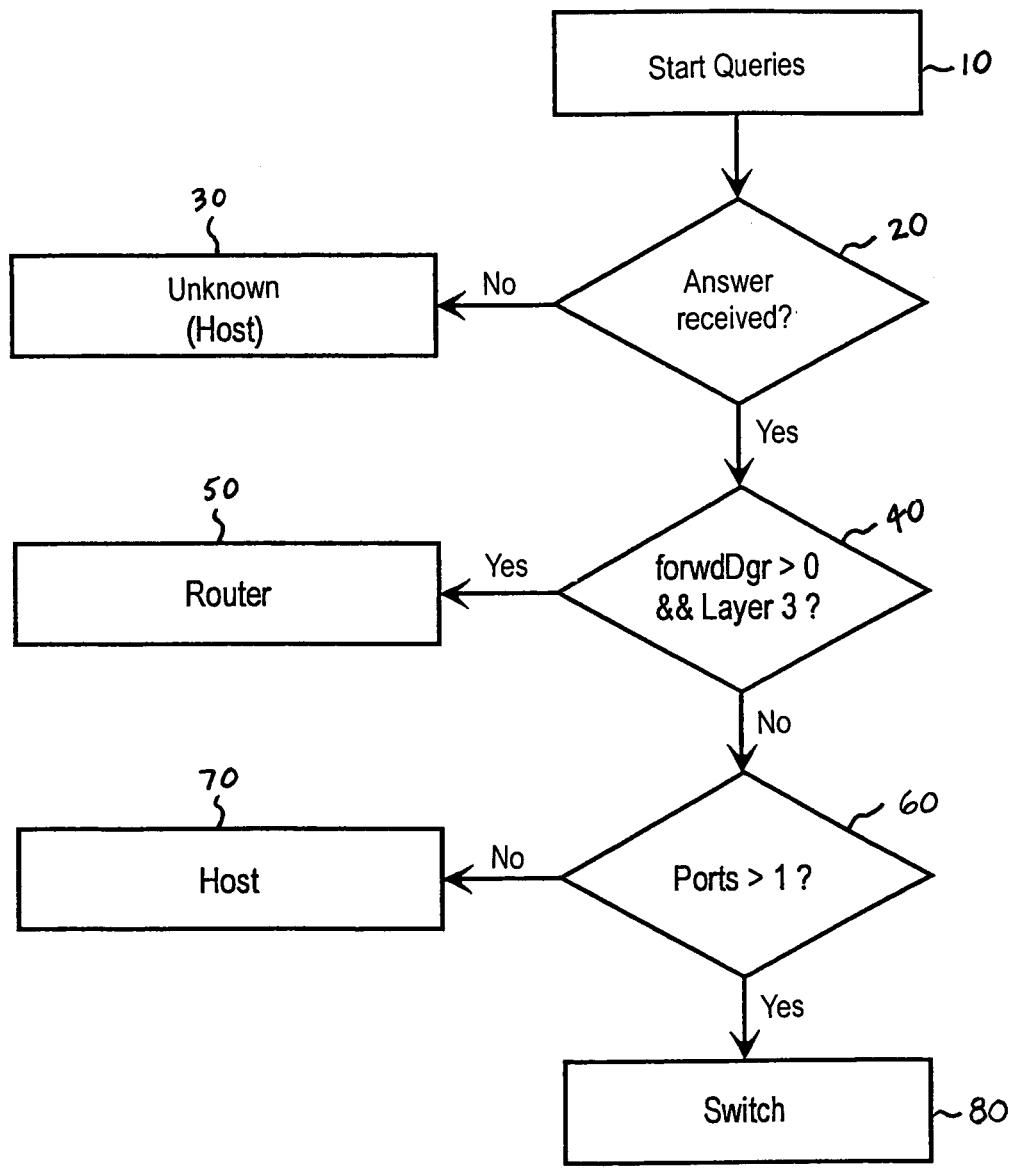
FIG. 2 shows a flowchart for illustrating the main steps performed in the method according to one embodiment of the invention.

In order to better illustrate the method, the description of FIG. 2 includes further references to the designations and reference characters used in FIG. 1.

According to the method, starting from the central management component M as a basis it is determined in a first step whether a network component G-A, G-B, G-C is a management-capable network component G-A, G-B, G-C. For this purpose a check is made to confirm whether a management agent unit A assigned to the central management component M is implemented in the network component G-A, G-B, G-C, i.e. whether the network component G-A, G-B, G-C responds to the inquiry transmitted by the central management component M (FIG. 2, items 10 and 20).

If no management agent unit A is implemented in the network component G-A, G-B, G-C, no management information can be polled from this network component G-A, G-B, G-C. The class to which the network component G-A, G-B, G-C belongs is therefore unknown. In most instances such network components are hosts in this case (FIG. 2, item 30).

If a response by a network component G-A, G-B, G-C is received at the central management component M, in a second step a check is made to determine whether the network component G-A, G-B, G-C supports layer 3 of the OSI reference model and whether data packets have already been forwarded between the interfaces of the network component G-A, G-B, G-C (FIG. 2, item 40).

Whether the network component G-A, G-B, G-C supports layer 3 of the OSI reference model is determined in this case by interrogation of the managed object "sysServices". Each router tested reports that layer 3 of the OSI reference model is supported, but so also do certain switches, or routers configured as such. In order to be able to rule out these cases the history of the network component G-A, G-B, G-C is considered in addition.

For this purpose the managed object "ipForwDatagrams" is interrogated by the central management component M. The managed object "ipForwDatagrams" is defined as a counter which is only incremented when data packets are switched on the basis of layer 3 of the OSI reference model.

Consequently, in cases in which it is indicated by the managed object "sysServices" that layer 3 of the OSI reference model is supported and in which the managed object "ipForwDatagrams" has a value different than the value 0, the network component G-A, G-B, G-C is classified as a router (FIG. 2, item 50).

A problem arises in the case of network components G-A, G-B, G-C which were active as routers and subsequently were reconfigured as switches. When this reconfiguration is performed, the managed object "ipForwDatagrams" may not automatically be reset to 0 in certain circumstances. In this case if the switch continues to report that it supports layer 3 of the OSI reference model, it will be wrongly classified as a router and not as a switch. In order to avoid this incorrect behavior care must be taken to ensure that in a reconfiguration of this kind the managed object "ipForwDatagrams" is reset manually.

If a negative result is obtained from the check performed in the second step, in a third step the number of ports of the network component G-A, G-B, G-C is determined in addition (FIG. 2, item 60). This is accomplished by interrogation of the managed object "ifNumber". In cases in which the number of ports is greater than 1, the network component G-A, G-B, G-C is classified as a switch (FIG. 2, item 80), and in the other cases as a host (FIG. 2, item 70).

The topology information determined in the central management component M by the method can be used for example as part of a resource management scheme or for acceptance monitoring for real-time-critical network connections. Use in the context of network planning tools is also possible.

The invention has been described in detail with particular reference to preferred embodiments thereof and examples, but it will be understood that variations and modifications can be effected within the spirit and scope of the invention.

What is claimed is:

1. A method for classifying network components of a packet-oriented network, comprising:
   determining, from a central management component, whether a network component is a management-capable network component; and
   if the network component is a management-capable network component, determining whether the network component supports layer 3 of the OSI reference model and determining whether data packets have already been forwarded in the past between the interfaces of the management-capable network component in order to classify the management-capable network component.

2. The method according to claim 1, wherein
   a management agent unit is provided in each network component that is a management-capable network component, and
   the management agent unit enables communication between the central management component and the management-capable network component.

3. The method according to claim 2, wherein communication between the central management component and the management agent unit takes place according to an SNMP protocol.

4. The method according to claim 1, wherein the network component is classified as a host, a router or a switch.

5. The method according to claim 4, further comprising:
   if the network component supports layer 3 and data packets have already been forwarded, classifying the network component as a router.

6. The method according to claim 5, wherein
   if the network component does not support layer 3 and/or the network component has not already forwarded data packets, then ports of the network component are counted,
   if the number of ports is greater than 1, the network component is classified as a switch, and
   if the number of ports is not greater than 1, then the network component is classified as a host.

7. The method according to claim 5, wherein
   the network component has a management information base with managed objects, and
   whether the network component supports layer 3 and whether data packets have already been forwarded are determined by an interrogation of the managed objects.

8. The method according to claim 7, wherein the management information base is administered by a management agent unit provided in the network component.

9. The method according to claim 1, further comprising, if the network component is not a management-capable network component, presuming that the network component is a host.

10. A central management component, comprising:
    an inquiry unit to determine, whether a network component is a management-capable network component; and
    a classification unit to determine whether the network component supports layer 3 of the OSI reference model and determine whether data packets have already been forwarded in the past between the interfaces of the management-capable network component in order to classify the management-capable network component, if the network component is a management-capable network component.

11. A computer readable storage medium storing a computer program to control a processor to perform a method for classifying network components of a packet-oriented network, the method comprising:
    determining, from a central management component, whether a network component is a management-capable network component; and
    if the network component is a management-capable network component, determining whether the network component supports layer 3 of the OSI reference model and determining whether data packets have already been forwarded in the past between the interfaces of the management-capable network component in order to classify the management-capable network component.

* * * * *